United States Patent
Shirakata et al.

(10) Patent No.: US 8,761,319 B2
(45) Date of Patent: Jun. 24, 2014

(54) RECEPTION DEVICE

(75) Inventors: Naganori Shirakata, Kanagawa (JP);
Takenori Sakamoto, Kanagawa (JP)

(73) Assignee: Panasonic Corporation, Osaka (JP)

( * ) Notice: Subject to any disclaimer, the term of this patent is extended or adjusted under 35 U.S.C. 154(b) by 5 days.

(21) Appl. No.: 13/814,204

(22) PCT Filed: Feb. 13, 2012

(86) PCT No.: PCT/JP2012/000943
§ 371 (c)(1),
(2), (4) Date: Feb. 4, 2013

(87) PCT Pub. No.: WO2012/132195
PCT Pub. Date: Oct. 4, 2012

(65) Prior Publication Data
US 2013/0136216 A1 May 30, 2013

(30) Foreign Application Priority Data
Mar. 30, 2011 (JP) .................................. 2011-075831

(51) Int. Cl.
*H04L 27/06* (2006.01)

(52) U.S. Cl.
USPC ........... 375/343; 375/295; 375/316; 375/322; 375/340; 375/342

(58) Field of Classification Search
USPC ......... 375/295, 316, 322, 326, 340, 342, 343, 375/344, 350
See application file for complete search history.

(56) References Cited

U.S. PATENT DOCUMENTS

| 5,396,196 | A | * | 3/1995 | Blodgett | 332/103 |
|---|---|---|---|---|---|
| 6,498,929 | B1 | | 12/2002 | Tsurumi et al. | |
| 7,035,589 | B1 | * | 4/2006 | Meng et al. | 455/63.1 |
| 7,835,467 | B2 | * | 11/2010 | Gupta | 375/319 |
| 7,848,470 | B2 | * | 12/2010 | Hidaka | 375/350 |
| 8,068,563 | B2 | * | 11/2011 | Nekhamkin et al. | 375/326 |
| 8,112,034 | B2 | * | 2/2012 | Ibrahim et al. | 455/41.2 |
| 8,289,197 | B2 | * | 10/2012 | Nakamoto | 341/118 |
| 2005/0079850 | A1 | * | 4/2005 | Chen et al. | 455/324 |
| 2005/0208916 | A1 | | 9/2005 | Peterzell et al. | |
| 2007/0281655 | A1 | * | 12/2007 | Ishikawa et al. | 455/296 |

(Continued)

FOREIGN PATENT DOCUMENTS

| EP | 1 869 779 A1 | 12/2007 |
|---|---|---|
| JP | 10-247953 A | 9/1998 |

(Continued)

OTHER PUBLICATIONS

International Search Report, mailed May 1, 2012, for International Application No. PCT/JP2012/000943, 2 pages.

*Primary Examiner* — Hirdepal Singh
(74) *Attorney, Agent, or Firm* — Seed IP Law Group PLLC

(57) ABSTRACT

There are provided a correlation calculation unit that takes a cross-correlation between a signal from which a DC component of an analog baseband signal is removed, and to which a known fixed DC offset is added, and a known signal, an inter-correlation peak phase difference detection unit that estimates a carrier frequency offset from a peak of the calculated correlation vector, and a residual DC offset estimation unit that estimates a residual DC offset component from a mean value of the sidelobe of the calculated correlation vector.

4 Claims, 5 Drawing Sheets

(56) References Cited

U.S. PATENT DOCUMENTS

| | | | |
|---|---|---|---|
| 2008/0076376 A1* | 3/2008 | Yang et al. | 455/313 |
| 2008/0089443 A1* | 4/2008 | Sanada et al. | 375/319 |
| 2008/0298506 A1* | 12/2008 | Takagi et al. | 375/319 |
| 2012/0281550 A1* | 11/2012 | Huang | 370/249 |
| 2012/0294347 A1* | 11/2012 | Husted et al. | 375/224 |

FOREIGN PATENT DOCUMENTS

| | | |
|---|---|---|
| JP | 3486058 B | 10/2003 |
| JP | 2005-507568 A | 3/2005 |
| JP | 2008-536367 A | 9/2008 |
| JP | 2008-236704 A | 10/2008 |

\* cited by examiner

RECEPTION DEVICE

TECHNICAL FIELD

The present invention relates to a reception device that is applied to a wireless communication apparatus that conducts a communication by using a single carrier signal.

BACKGROUND ART

A service for supplying data including a variety of large-capacity contents using a high-definition moving image, a still image, or a sound to an end user through a wireless communication has been studied. In order to transmit large-volume data of several G (giga) bits at a high speed, a radio communication system that conducts high-speed transmission of several Gbps with the use of a millimeter waveband including a 60 GHz band has been studied.

In the millimeter wave wireless communication system, a wireless PAN (personal area network) standardization work is conducted by IEEE 802.15.3c, for example, a wireless LAN (local area network) standardization work is conducted by IEEE 802.11ad.

For example, in a single carrier communication using the millimeter waveband studied by IEEE 802.11ad, a signal that has been subjected to PSK or QAM modulation is transmitted at a transmission rate of 1.76 G symbol/sec. Because one symbol time is shorter, that is, about 0.57 nsec, data is transmitted at an ultrahigh speed in the millimeter wave wireless communication system. Now, an example in which 60 GHz band is used as the millimeter waveband will be described.

In a transmission device, the above modulated baseband signal is frequency-converted into a 60 GHz band by a radio frequency circuit (RF unit), and transmitted from an antenna.

In a reception device, a signal of the 60 GHz band, which is input from an antenna, is frequency-converted into a baseband signal by a radio frequency circuit (RE unit). As the RF unit, several systems including a superheterodyne system or a direct conversion system have been studied. The direct conversion system mixes a carrier frequency of 60 GHz directly with a modulated signal of the 60 GHz band to convert the signal directly into the baseband signal band.

The RF unit of the direct conversion system is simple in the circuit configuration, thereby leading to a reduction in the number of components and a reduction in the power consumption. However, the RF circuit of the direct conversion system suffers from such a problem that a DC offset occurs in the baseband signal by self-mixing in the RF unit. There has been known that the DC offset requires baseband signal processing, for example, an excess dynamic range for the AD converter, and also affects a GC (Gain Control) circuit and a frequency synchronization circuit.

Also, an error of respective oscillators incorporated into the transmission device and the reception device causes a slight error between the carrier frequency of the transmission device side and the carrier frequency of the reception device side. This results in such a problem that the carrier frequency offset occurs in the reception device. There has been known that the carrier frequency offset fluctuates a phase in a receive signal, and causes the deterioration of a demodulation performance.

In the reception device using a direct conversion in the RF unit, as a technique for correcting the carrier frequency offset, there is a wireless communication apparatus disclosed in for example, Patent Literature 1. In Patent Literature 1, the wireless communication apparatus receives a preamble signal having no DC component, converts the preamble signal into a digital signal by an AD converter, and thereafter removes a DC offset component caused by the direct conversion with the use of a high-pass filter (HPF). The wireless communication apparatus estimates the frequency offset with the use of the preamble signal from which the DC offset component has been removed. Then, the wireless communication apparatus corrects the frequency offset of the subsequent receive signal with the use of a frequency offset estimated result.

Also, in the reception device using the direct conversion in the RF unit, as a technique for correcting the DC offset, there is a receiver disclosed in, for example. Patent Literature 2. In Patent Literature 2, the receiver detects the DC offset from a signal that has been converted into a digital signal by an AD converter, converts the amount of correction into an analog signal by a DA converter, and adds the converted analog signal to an analog signal to be input to the AD converter, to thereby correct the DC offset.

CITATION LIST

Patent Literatures

Patent Literature 1: JP-A-2008-236704
Patent Literature 2: Japanese Patent No. 3486058

SUMMARY OF INVENTION

Technical Problem

In the above-mentioned conventional art, it is assumed that the signal having no DC component is received, and it is difficult to apply the conventional art to a single carrier signal having the DC component. That is, it is difficult to estimate or correct a carrier frequency offset or a DC offset with respect to the receive signal of the single carrier signal having the DC component.

The present invention has been made in view of the above circumstances, and a first object of the present invention is to provide a reception device that can estimate and correct a carrier frequency offset with high precision, with respect to the receive signal of the single carrier signal having the DC component.

Also, a second object of the present invention is to provide a reception device that can estimate and correct a DC offset with high precision, with respect to the receive signal of the single carrier signal having the DC component.

Solution to Problem

According to one aspect of the present invention, there is provided a reception device configured to receive a single carrier signal, comprising: a filter configured to remove a DC component of a baseband signal of a received single carrier signal; a fixed DC offset addition unit configured to add, as a fixed DC offset, a DC component included in a known signal to a signal from which the DC component has been removed; a correlation calculation unit configured to calculate a cross-correlation between the signal to which the fixed DC offset has been added and the known signal; a carrier frequency offset estimation unit configured to estimate a carrier frequency offset according to a peak of the correlation vector calculated by the correlation calculation unit; and a frequency correction unit configured to correct a frequency of the baseband signal on the basis of the estimated carrier frequency offset.

According to the above constitution, the carrier frequency offset can be estimated and corrected with high precision with respect to the receive signal of the single carrier signal having the DC component.

According to another aspect of the present invention, the reception device as described above further comprises: a residual DC offset estimation unit configured to estimate a residual DC offset according to a mean value of a sidelobe of the correlation vector calculated in the correlation calculation unit; and a DC offset correction unit configured to correct the DC offset of the baseband signal on the basis of the estimated residual DC offset.

According to the above constitution, the DC offset can be estimated and corrected with high precision with respect to the receive signal of the single carrier signal having the DC component.

Advantageous Effects of Invention

According to the present invention, the carrier frequency offset can be estimated and corrected with high precision with respect to the receive signal of the single carrier signal having the DC component.

According to the present invention, the DC offset can be estimated and corrected with high precision with respect to the receive signal of the single carrier signal having the DC component.

BRIEF DESCRIPTION OF DRAWINGS

FIGS. 3A to 3C are diagrams illustrating the operation of a carrier frequency offset estimation with respect to the signal of a preamble, in which FIG. 3A is a timing chart illustrating an amplitude of a correlation vector of an output of a correlation calculation unit, FIG. 3B is a timing chart illustrating a phase for each peak of the correlation vector, and FIG. 3C is a diagram illustrating the correlation vector on an IQ plane.

FIGS. 4A and 4B are schematic diagrams illustrating an example of the correlation vector of a signal to which a fixed DC offset is not added for comparison, in which FIG. 4A is a timing chart illustrating the amplitude of the correlation vector, and FIG. 4B is a diagram illustrating the correlation vector on an IQ plane.

DESCRIPTION OF EMBODIMENTS

In the following embodiment, a configuration example of a reception device that can be applied to a millimeter wave wireless communication system which conducts high-speed transmission with the use of a millimeter waveband will be described as an example of the reception device that receives a single carrier signal.

Figure 2:
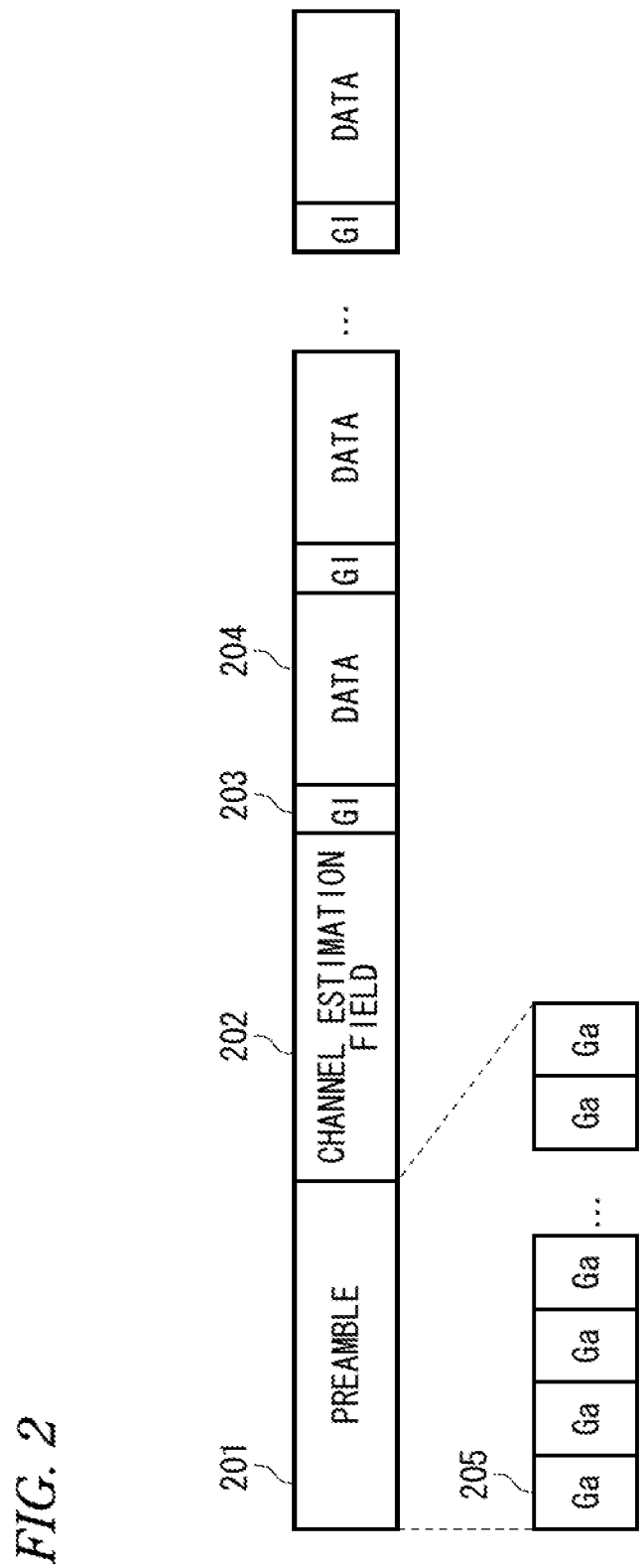
FIG. 2 is a diagram illustrating an example of a frame format of a communication signal that is received by the reception device according to the embodiment of the present invention.

FIG. 2 is a diagram illustrating an example of a frame format of a communication signal that is received by a reception device according to an embodiment of the present invention.

A communication signal includes a preamble 201, a channel estimation field 202, a guard interval (GI) 203, and data 204.

The preamble 201 is a signal provided in a head of a frame in the communication signal, and includes a signal in which a known signal waveform is repeated by a plurality of times. For example, the preamble 201 uses a waveform obtained by repeating, by a plurality of times, a signal waveform in which a Golay code (Ga) 205 of 128 bits excellent in a correlation characteristic is subjected to BPSK modulation, as one unit. The reception device obtains repetition of the known signal waveform of the preamble 201 by correlation detection, and the obtained repetition is used for at least one processing of the detection of a frame, a gain control, and a carrier frequency synchronization.

The channel estimation field 202 is a signal provided after the preamble 201. The channel estimation field 202 includes a plurality of known signal waveforms, and the reception device uses the signal waveforms for estimation of a channel distortion between the reception device and the transmission device. For example, the channel estimation field 202 includes, for example, a signal waveform in which the Golay code of 128 bits, and a complementary code of the Golay code of 128 bits are subjected to BPSK modulation.

The guard interval 203 is a signal inserted in the separation of the data 204. The guard interval 203 includes a known signal waveform, and includes, for example, a signal in which the Golay code of 64 bits is subjected to the BPSK modulation.

The data 204 includes a symbol string in which a data bit string that has been subjected to error correcting coding on a block basis is modulated by PSK modulation or QAM modulation. The PSK modulation includes BPSK, QPSK, and 8-PSK, and the QAM modulation includes 16QAM, 64QAM, and 256QAM.

In the transmission device, the symbol string of the transmit signal which has been subjected to the digital modulation by the above-mentioned signal format passes through a root-raised cosine filter as a transmission band limiting filter, and is then converted into an analog baseband signal by a DA converter. Then, the analog baseband signal is converted into a single carrier radio frequency signal, power-amplified by the RF unit, and transmitted from an antenna.

The Golay code 205 of 128 bits used for the preamble 201 can be generated by using a variety of generating polynomials. In this example, in the generated code of 128 bits, if the numbers of 0 and 1 are equal to each other, when signals are mapped to signal points of the BPSK −1 and 1, a mean value becomes 0, and the signals include no DC component. However, in the code of 128 bits, the numbers of 0 and 1 are unbalanced, the mean value of the signals that have been mapped to the signal points −1 and 1 of the BPSK does not become 0, but the signals include the DC component.

In this example, the signals in which the Golay code has been subjected to BPSK modulation, which is used as the known signal waveform, in the preamble 201 of a single carrier signal is a code including the DC component. As the Golay code whose application has been studied in the communication standards for conducting a communication using the single carrier signal, the code including the DC component is present in the signal that has been subjected to the BPSK modulation.

Figure 1:
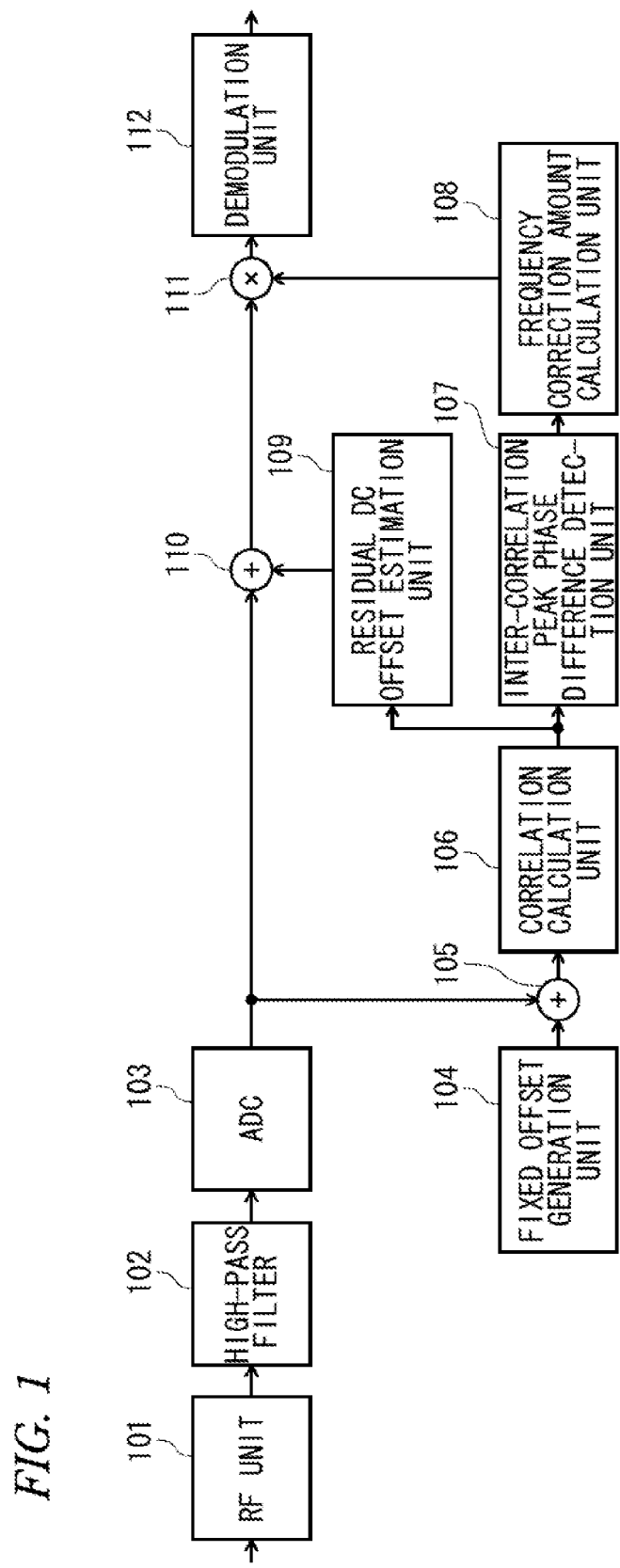
FIG. 1 is a block diagram illustrating a main configuration of a reception device according to an embodiment of the present invention.

FIG. 1 is a block diagram illustrating a main configuration of a reception device according to an embodiment of the present invention. The reception device includes an RF unit 101, a high-pass filter (HPF) 102, an AD converter (ADC) 103, and a demodulation unit 112. Also, the reception device includes a fixed offset generation unit 104, a first offset adder 105, a correlation calculation unit 106, an inter-correlation peak phase difference detection unit 107, a frequency correction amount calculation unit 108, and a frequency correction unit 111. Further, the reception device includes a residual DC offset estimation unit 109, and a second offset adder 110.

The RF unit 101 frequency-converts a single carrier radio frequency signal into a baseband signal by direct conversion. The high-pass filter 102 functions as a filter that removes the DC component, and cuts off a low frequency band of the baseband signal to remove or reduce the DC component. The high-pass filter 102 uses different filter characteristics among the preamble 201, the guard interval 203, and the data 204. That is, the high-pass filter 102 can switch a filter characteristic according to the respective fields of the signal format.

The AD converter 103 converts the baseband signal from which the DC component has been removed or reduced into a digital signal. The demodulation unit 112 demodulates a modulated signal of the digital signal, and acquires received data.

The fixed offset generation unit 104 generates an offset (fixed DC offset) corresponding to the DC component included in the known Golay code. The fixed offset generation unit 104 switchingly generates the fixed DC offset corresponding to the DC components included in the respective codes, in correspondence with the Golay codes used in the respective fields of the signal format. For example, the different fixed DC offset is switchingly generated between the preamble 201 and the guard interval 203.

The fixed DC offset is obtained by a mean value of the DC components of the Golay code. When the Golay code 205 is repeated by a plurality of times as with the preamble 201, the fixed DC offset is set by the mean value of the DC components in each code.

The first offset adder 105 adds the fixed DC offset generated by the fixed offset generation unit 104 to an output of the AD converter 103. The fixed offset generation unit 104 and the first offset adder 105 realize a function of a fixed DC offset addition unit. When the Golay code used as the known signal waveform does not include the DC component in a BPSK modulation signal, the fixed DC offset becomes 0.

The correlation calculation unit 106 holds the known Golay code, and calculates a cross-correlation between the known Golay code and the receive signal of the known signal waveform. The correlation calculation unit 106 obtains a correlation value (correlation vector) by sliding correlation processing with respect to, for example, the receive signal of the known signal waveforms of the preamble 201 and the guard interval 203. The receive signal of the known signal waveform for obtaining the correlation is a signal to which the offset of the DC component included in the Golay code is added, after the DC component has been removed or reduced before AD conversion.

The inter-correlation peak phase difference detection unit 107 detects a phase difference between correlation peaks on the basis of a correlation output from the correlation calculation unit 106. The frequency correction amount calculation unit 108 estimates a carrier frequency offset, and calculates a frequency correction amount (correction vector) for zeroing the phase difference, on the basis of the phase difference between the correlation peaks detected by the inter-correlation peak phase difference detection unit 107. The inter-correlation peak phase difference detection unit 107 and the frequency correction amount calculation unit 108 realize a function of a carrier frequency offset estimation unit. The estimation of the carrier frequency offset is conducted by using the preamble 201. The frequency correction unit 111 multiplies an output of the AD converter 103 by the frequency correction amount (correction vector) to correct the carrier frequency offset.

The residual DC offset estimation unit 109 estimates a residual DC offset in the correlation output from the correlation calculation unit 106, and calculates a correction value for zeroing the residual DC offset. It is preferable that the guard interval 203 and the data 204 are used for the estimation of the residual DC offset. The second offset adder 110 adds a residual DC offset correction value calculated in the residual DC offset estimation unit 109 to the output of the AD converter 103. The second offset adder 110 realizes a function of a DC offset correction unit.

Subsequently, a description will be given in detail of the operation of the reception device according to this embodiment.

The single carrier radio frequency signal received by the antenna is down-converted by direct conversion by the RF unit 101, and converted into a baseband signal. The DC offset caused by self-mixing occurs in the baseband signal that has been subjected to the frequency conversion by the direct conversion, which is a level that exceeds an input range of the AD converter 103.

In order to remove the DC offset caused by the above-mentioned direct conversion, the baseband signal is input to the AD converter 103 after the DC component has been removed from the baseband signal through the high-pass filter 102. It is preferable that the preamble 201 in the signal format is used for the estimation and correction of the carrier frequency offset. The signal of the preamble 201 includes the DC component of the Golay code. However, the DC component is removed from the signal by the high-pass filter 102, and the signal is input to the AD converter 103 in a state where a dynamic range is decreased. The baseband signal that has passed through the high-pass filter 102 is converted into a digital signal by the AD converter 103, and output.

From the digital signal from which the DC offset has been removed, the DC component of the Golay code in the preamble 201 necessary as a signal component is also removed, in addition to the DC offset caused by the direct conversion, in the preamble 201.

In this embodiment, the fixed DC offset corresponding to the DC component included in the known Golay code is generated by the fixed offset generation unit 104, and the fixed DC offset is added to the digital signal of the output of the AD converter 103 by the first offset adder 105. When the carrier frequency offset is estimated by using the preamble 201, the fixed offset generation unit 104 generates the fixed DC offset corresponding to the DC component of the Golay code in the preamble 201.

An output of the first offset adder 105 is input to the correlation calculation unit 106 to calculate a cross-correlation. The correlation calculation unit 106 obtains the cross-correlation between the input signal and the Golay code of the preamble 201.

Figure 3A:
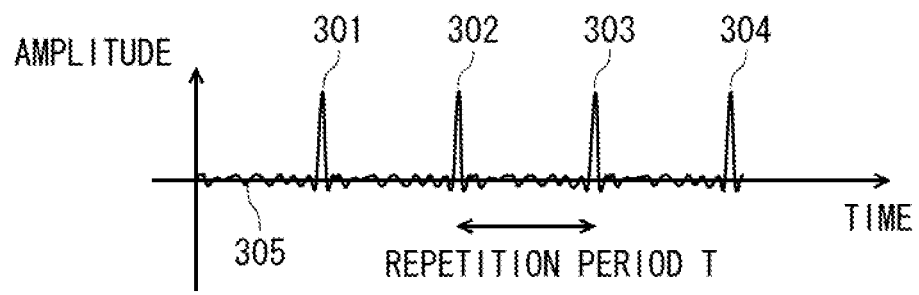
Figure 3B:
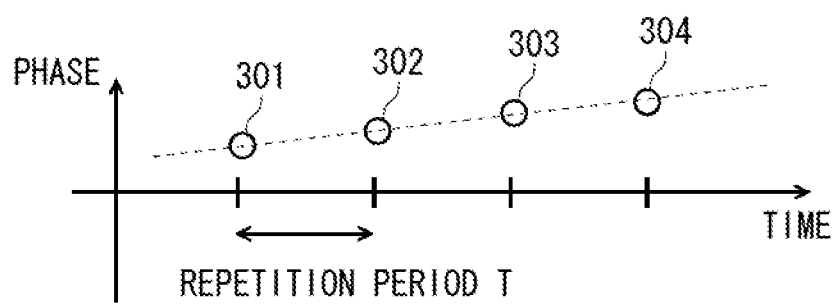
Figure 3C:
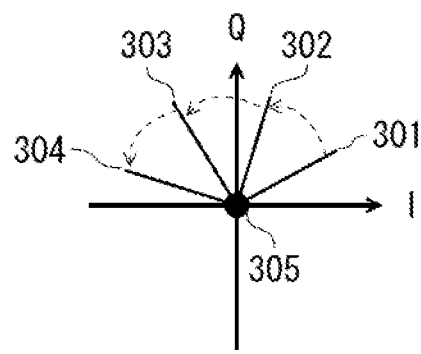

FIGS. 3A to 3C are diagrams illustrating the operation of a carrier frequency offset estimation with respect to the signal of the preamble 201, which is a schematic diagram illustrating an example of the correlation vector of the Golay code. In FIGS. 3A to 3C, FIG. 3A is a timing chart illustrating an amplitude of a correlation vector of an output of the correlation calculation unit 106, FIG. 3B is a timing chart illustrating a phase for each peak of the correlation vector, and FIG. 3C is a diagram illustrating the correlation vector on an IQ plane.

The correlation calculation unit 106 conducts sliding correlation processing of an input signal R(t) and a known Golay code G(t), and outputs a correlation vector C(t).

$$C(t) = \Sigma R(t) G(t)^* \quad (1)$$

where * represents a complex conjugate.

In the correlation vector C(t), a peak of the correlation vector appears for each repetition period T of the Golay code 205 within the preamble 201. As illustrated in FIG. 3A, a correlation vector 305 becomes a waveform having peaks 301, 302, 303, and 304 by the repetition period T of the Golay code 205. When the peak amplitude is normalized, the correlation vector C(t) is represented as follows.

$$C(t) = 1 \quad \text{(when } t = kT, \; k \text{ is the number of repetitions)} \quad (2)$$
$$= 0 \quad \text{(other cases)}$$

When a carrier frequency offset Δf is present in the input signal, the correlation vector C(t) is represented as follows.

$$C(t) = \Sigma R(t) \exp(j2\pi \Delta f t) G(t)^* \quad (3)$$
$$= \exp(j2\pi \Delta f kT) \quad (t = kT)$$
$$= 0 \quad \text{(other cases)}$$

Hence, the correlation vector C(t) at a peak timing (t=kT) produces phase rotation proportional to the carrier frequency offset Δf. As illustrated in FIG. 3B, at peak timings for each repetition period T, the correlation vector C(t), that is, the peaks 301, 302, 303, and 304, the phase rotates in sequence in proportion to the carrier frequency offset.

The inter-correlation peak phase difference detection unit 107 receives the correlation vector output from the correlation calculation unit 106, and obtains a phase difference Δθ between the correlation vectors at the peak timing. As illustrated in FIG. 3C, when the carrier frequency offset Δf is present in the input signal, the phases of the peaks 301, 302, 303, and 304 of the correlation vector rotate about an origin on an IQ plane in increments of the phase difference Δθ.

The frequency correction amount calculation unit 108 calculates a correction vector as a frequency correction amount for correcting the carrier frequency offset on the basis of the phase difference Δθ between the peaks of the correlation vector. The carrier frequency offset Δf can be estimated according to a mean value of the phase difference Δθ between the peaks of the correlation vector, and the repetition period T.

$$\Delta\theta = (\arg(C(kT)) - \arg(C((k-1)T)))/T \quad (4)$$
$$= 2\pi\Delta f kT - 2\pi\Delta f (k-1)T$$
$$= 2\pi\Delta f$$

That is, the frequency correction amount calculation unit 108 obtains the carrier frequency offset Δf from the phase difference Δθ between the correlation vectors, and calculates the correction vector for canceling the carrier frequency offset Δf.

The calculated correction vector is multiplied by an output of the AD converter 103 through the frequency correction unit 111 to correct the carrier frequency offset. The receive signal of the baseband signal in which the carrier frequency offset has been corrected is subjected to decoding processing by the demodulation unit 112 to demodulate the received data.

Figure 4A:
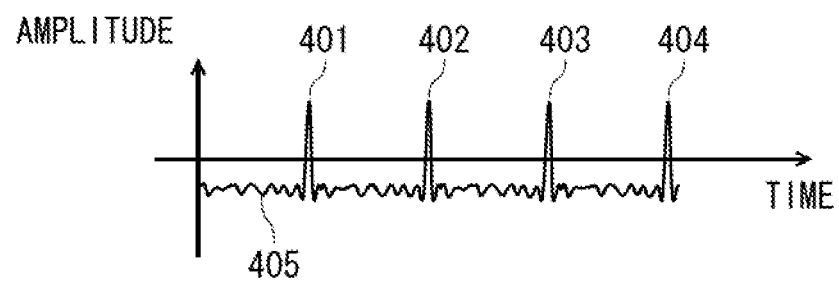
Figure 4B:
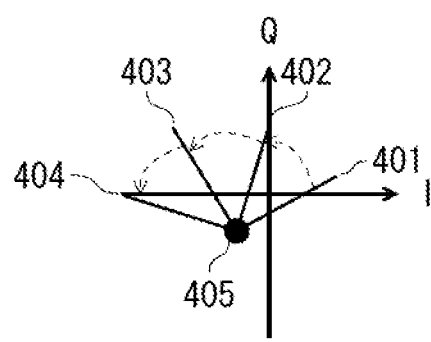

FIGS. 4A and 4B are schematic diagrams illustrating an example of the correlation vector of the Golay code due to a signal to which the fixed DC offset is not added for comparison. In an example of FIGS. 4A and 4B, the signal from which the DC component has been removed by the high-pass filter is subjected to correlation calculation as it is without addition of the fixed DC offset. In FIGS. 4A and 4B, FIG. 4A is a timing chart illustrating the amplitude of the correlation vector, and FIG. 4B is a diagram illustrating the correlation vector on the IQ plane.

Like FIG. 3A, as illustrated in FIG. 4A, a correlation vector 405 becomes a waveform having peaks 401, 402, 403, and 404 for each repetition period T of the Golay code 205 within the preamble 201. Because the DC component has been removed therefrom, it appears that the DC component originally necessary as the signal component occurs as a reverse offset. For that reason, a negative amplitude appears in the correlation vector (sidelobe of correlation vector) other than the peak timing.

As illustrated in FIG. 4B, when the carrier frequency offset is present in the input signal, the phases of the peaks 401, 402, 403, and 404 of the correlation vector rotate. However, the center of rotation is displaced from the origin of the IQ plane by the reverse offset of the DC component. For that reason, it is difficult to obtain the phase difference between the peaks with precision.

On the other hand, in the above-mentioned example of FIGS. 3A to 3C, the correlation calculation is conducted by the correlation calculation unit 106 after addition of the fixed DC offset necessary as the signal component of the Golay code. As illustrated in FIG. 3A, the amplitude of the correlation vector 305 other than the peak timing becomes 0 in the mean value, and as illustrated in FIG. 3C, the phases of the peaks 301, 302, 303, and 304 of the correlation vector rotate about the origin of the IQ plane. For that reason, the phase differences between the peaks can be correctly obtained, and the carrier frequency offset can be estimated with high precision.

Also, the correlation vector (sidelobe of correlation vector) other than the peak timing, which is output from the correlation calculation unit 106, is input to the residual DC offset estimation unit 109. It is preferable that the guard interval 203 in the signal format is used for the estimation of the residual DC offset, and the residual DC offset is corrected in the subsequent data 204.

In the guard interval 203 and the data 204, the filter characteristic of the high-pass filter 102 is switched from that of the preamble 201 to another. When the cutoff frequency of the high-pass filter 102 is switched to another, the DC component may occur from the output of the high-pass filter 102. A temporal variation of the DC component in the signal appears as the residual DC offset. In the guard interval 203 and the data 204, the DC component is not completely removed by the high-pass filter 102 unlike the preamble 201, but a time constant of the filter is lengthened (cutoff frequency is decreased) to partially pass through the DC component. This is to ensure the demodulation performance of the signal of the data 204.

In the fixed offset generation unit 104, the fixed DC offset corresponding to the DC component of the Golay code in the guard interval 203 occurs. Also, taking the filter characteristic of the high-pass filter 102 into consideration, the fixed DC offset obtained from the mean value of the DC component of the Golay code and the circuit characteristic is set in advance.

Figure 5:
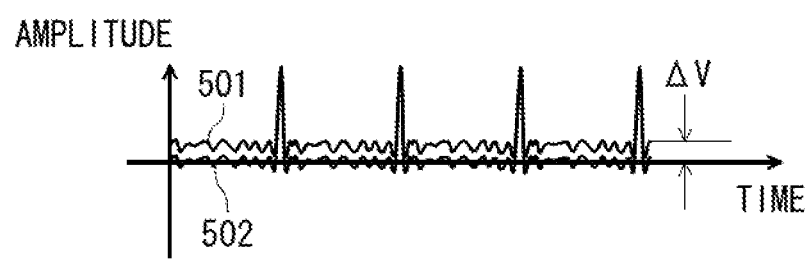
FIG. 5 is a diagram illustrating the operation of a residual DC offset estimation with respect to a signal of a guard interval.

FIG. 5 is a diagram illustrating the operation of the residual DC offset estimation with respect to a signal of the guard interval 203, which is a schematic diagram illustrating an example of the correlation vector of the Golay code. FIG. 5 is a timing chart illustrating the amplitude of the correlation vector of the output of the correlation calculation unit 106. The correlation calculation unit 106 obtains the cross-correlation between the input signal and the Golay code of the guard interval 203.

The residual DC offset estimation unit 109 estimates a residual DC offset ΔV from a correlation vector 501 other than the peak timing, that is, a mean value of the sidelobe of the correlation vector 501. If the residual DC offset ΔV is not present, the average value other than the peak timing becomes 0 as with a correlation vector 502. Then, the residual DC offset estimation unit 109 calculates the residual DC offset correction value for zeroing the amount of offset on the basis of the estimated residual DC offset ΔV.

The calculated residual DC offset correction value is added to the output of the AD converter 103 by the second offset adder 110 to correct the residual DC offset.

As described above, the parameters of the high-pass filter 102, the fixed offset generation unit 104, and the correlation calculation unit 106 are switched between a case where the carrier frequency offset is estimated by using the preamble 201, and a case where the residual DC offset is estimated by using the guard interval 203. That is, the filter characteristic of the high-pass filter 102 is switched for each filed between a field (for example, preamble 201) of the signal format for estimating the carrier frequency offset, and a field (for example, guard interval 203) of the signal format for estimating the residual DC offset. Also, the value of the fixed DC offset in the fixed offset generation unit 104 is switched in correspondence with the code of the known signal to be processed to switch the code for obtaining the cross-correlation by the correlation calculation unit 106.

As described above, in this embodiment, after the DC offset component caused by the direct conversion has been removed from the baseband signal of the known preamble in the single carrier signal through the high-pass filter, the carrier frequency offset is estimated. In the preamble of the single carrier signal, if the DC component is included in the signal per se, when the DC offset component is removed to obtain the correlation vector, it is difficult to estimate the carrier frequency offset with precision. Under the circumstances, in this embodiment, the correlation vector is obtained after addition of the DC component of the known signal waveform of the preamble with the result that the carrier frequency offset can be estimated with high precision.

Also, for example, the known signal included in the guard interval is used for the estimation of the residual DC offset. However, the DC component may be included in the signal per se of the single carrier signal. According to the reception device of this embodiment, because the DC offset component is removed through the high-pass filter before AD conversion, and the DC component of the known signal waveform is added to the AD converted signal, the residual DC offset can be estimated with high precision.

Also, in the millimeter wave wireless communication system which is high in the transmission speed, the dynamic range of the AD converter that operates at high speed is restricted, thereby making it difficult to subject the receive signal including the DC offset to digital conversion without any distortion. In this embodiment, the DC offset component is removed through the high-pass filter before AD conversion, and the DC component of the known signal waveform is added to the AD converted signal. As a result, the calculation of the correlation vector of the known signal as well as the estimation of the carrier frequency offset and the residual DC offset can be executed with high precision. Also, the correction of the DC offset can also deal with the limitation of the dynamic range of the AD converter.

Therefore, according to this embodiment, in the device for receiving the single carrier signal having the DC component, the estimation and correction of the carrier frequency offset, and the residual DC offset can be corrected with high precision. Also, the DC offset can be removed by a simple configuration even when the direct conversion is used in the RF unit.

Various changes and applications of the present invention may be made by those skilled in the art on the basis of the description of this specification and known techniques without departing from the spirit and scope of the present invention, and these are also included in the range of the request for protection. In addition, the respective components in the embodiments described above may be arbitrarily combined without departing from the scope of the invention.

In the embodiments, the cases in which the invention is realized by hardware have been described. However, the invention may be realized by software.

Further, respective function blocks used in the description of the embodiments may be typically realized by an LSI that is an integrated circuit. They may be individually fabricated into one chip or a part or the whole of them may be fabricated into one chip. Here, although LSI is exemplified, it may be called an IC, a system LSI, a super LSI, an ultra LSI, or the like, depending on the difference in integrity.

Further, the technique for the integrated circuit is not limited to LSI, and may be realized as a dedicated circuit or a general purpose processor. After the LSI fabrication, a FPGA (Field Programmable Gate array) that can be programmed after fabrication of the LSI or a reconfigurable processor that can reconfigure the connection or setting of the circuit cells in the LSI may be used.

Calculations of the respective functional blocks can be achieved by utilizing calculation means exemplified by a DSP or the CPU. Furthermore, process steps of each function can be conducted by being stored on a storage media as a program.

When a circuit integration technique capable of replacing LSI appears with the progress of semiconductor technology or other technologies derived from the semiconductor technology, the technique may be used to integrate the functional blocks. For example, biotechnology can be applied.

This application is based on Japanese Patent Application (Japanese Patent Application No. 2011-075831) filed on Mar. 30, 2011, the disclosure of which is incorporated herein by reference in its entirety.

INDUSTRIAL APPLICABILITY

The present invention has the advantage that the carrier frequency offset can be estimated and corrected with high precision with respect to the receive signal of the single carrier signal having the DC component, and the advantage that the DC offset can be estimated and corrected with high precision with respect to the receive signal of the single carrier signal having the DC component. The present invention is useful as the reception device to be applied to a wireless communication apparatus that conducts a communication by the single carrier signal. For example, the present invention can be widely applied to the general wireless communication devices including the mobile communication requiring a small circuit scale and a low power consumption as a carrier frequency offset correction and DC offset correction circuit used for the single carrier communication.

REFERENCE SIGNS LISTS

| | |
|---|---|
| 101 | RF unit |
| 102 | high-pass filter (HPF) |
| 103 | AD converter (ADC) |
| 104 | fixed offset generation unit |
| 105 | first offset adder |
| 106 | correlation calculation unit |
| 107 | inter-correlation peak phase difference detection unit |
| | 108 frequency correction amount calculation unit |
| 109 | residual DC offset estimation unit |
| 110 | second offset adder |
| 111 | frequency correction unit |
| 112 | demodulation unit |
| 201 | preamble |
| 202 | channel estimation field |
| 203 | guard interval (GI) |
| 204 | data |

The invention claimed is:

1. A reception device configured to receive a single carrier signal, comprising:
   a filter configured to remove a DC component of a baseband signal of a received single carrier signal;
   a fixed DC offset addition unit configured to add, as a fixed DC offset, a DC component included in a known signal to a signal from which the DC component has been removed;
   a correlation calculation unit configured to calculate a cross-correlation between the signal to which the fixed DC offset has been added and the known signal;
   a carrier frequency offset estimation unit configured to estimate a carrier frequency offset according to a peak of the correlation vector calculated by the correlation calculation unit; and
   a frequency correction unit configured to correct a frequency of the baseband signal on the basis of the estimated carrier frequency offset.

2. The reception device according to claim 1, further comprising:
   a residual DC offset estimation unit configured to estimate a residual DC offset according to a mean value of a sidelobe of the correlation vector calculated in the correlation calculation unit; and
   a DC offset correction unit configured to correct the DC offset of the baseband signal on the basis of the estimated residual DC offset.

3. The reception device according to claim 1,
   wherein the filter is configured to remove the DC component of an analog baseband signal,
   wherein the reception device further includes an AD converter configured to convert an output of the filter into a digital signal, and
   wherein the fixed DC offset addition unit is configured to add the fixed DC offset to the converted digital signal.

4. The reception device according to claim 2,
   wherein the filter is configured to remove the DC component of an analog baseband signal,
   wherein the reception device further includes an AD converter configured to convert an output of the filter into a digital signal, and
   wherein the fixed DC offset addition unit is configured to add the fixed DC offset to the converted digital signal.

* * * * *